United States Patent
Sosalla

[11] 3,841,412
[45] Oct. 15, 1974

[54] MULTIPLE-PIECE WING SECTIONS FOR CULTIVATOR AND SELECTIVELY LOCKING MEANS FOR SAME

[75] Inventor: Harry Sosalla, Sac City, Iowa

[73] Assignee: Royal Industries, Inc., Sac City, Iowa

[22] Filed: Dec. 18, 1972

[21] Appl. No.: 316,231

[52] U.S. Cl................ 172/311, 172/456, 172/776, 16/147, 24/249 LL
[51] Int. Cl........................................... A01b 15/14
[58] Field of Search .......... 172/310, 311, 456, 776; 280/411 R, 411 A, 412, 413; 16/147; 24/249 LL, 263 DL

[56] References Cited
UNITED STATES PATENTS

| | | | |
|---|---|---|---|
| 3,414,064 | 12/1968 | Foster | 172/311 |
| 3,487,882 | 1/1970 | Burton | 172/310 |
| 3,628,613 | 12/1971 | Kaufman | 172/311 |
| 3,692,121 | 9/1972 | Kenney | 172/456 |
| 3,700,040 | 10/1972 | Sosalla et al. | 172/311 |

Primary Examiner—Robert E. Pulfrey
Assistant Examiner—Paul T. Sewell
Attorney, Agent, or Firm—Hofgren, Wegner, Allen, Stellman & McCord

[57] ABSTRACT

An improved farm implement of the foldable, sectional tow type including a central section, including a wheeled cart and wing sections hingedly connected to the central section. Each of the wing sections is comprised of a plurality of hingedly connected frames to allow good ground coverage on abrupt terrain. The sections are further connected to the cart for movement between transport positions and cultivating positions and a lock is provided between the various frames of the wing section and operable to preclude the same from oscillating relative to each other when in the transport position.

8 Claims, 5 Drawing Figures

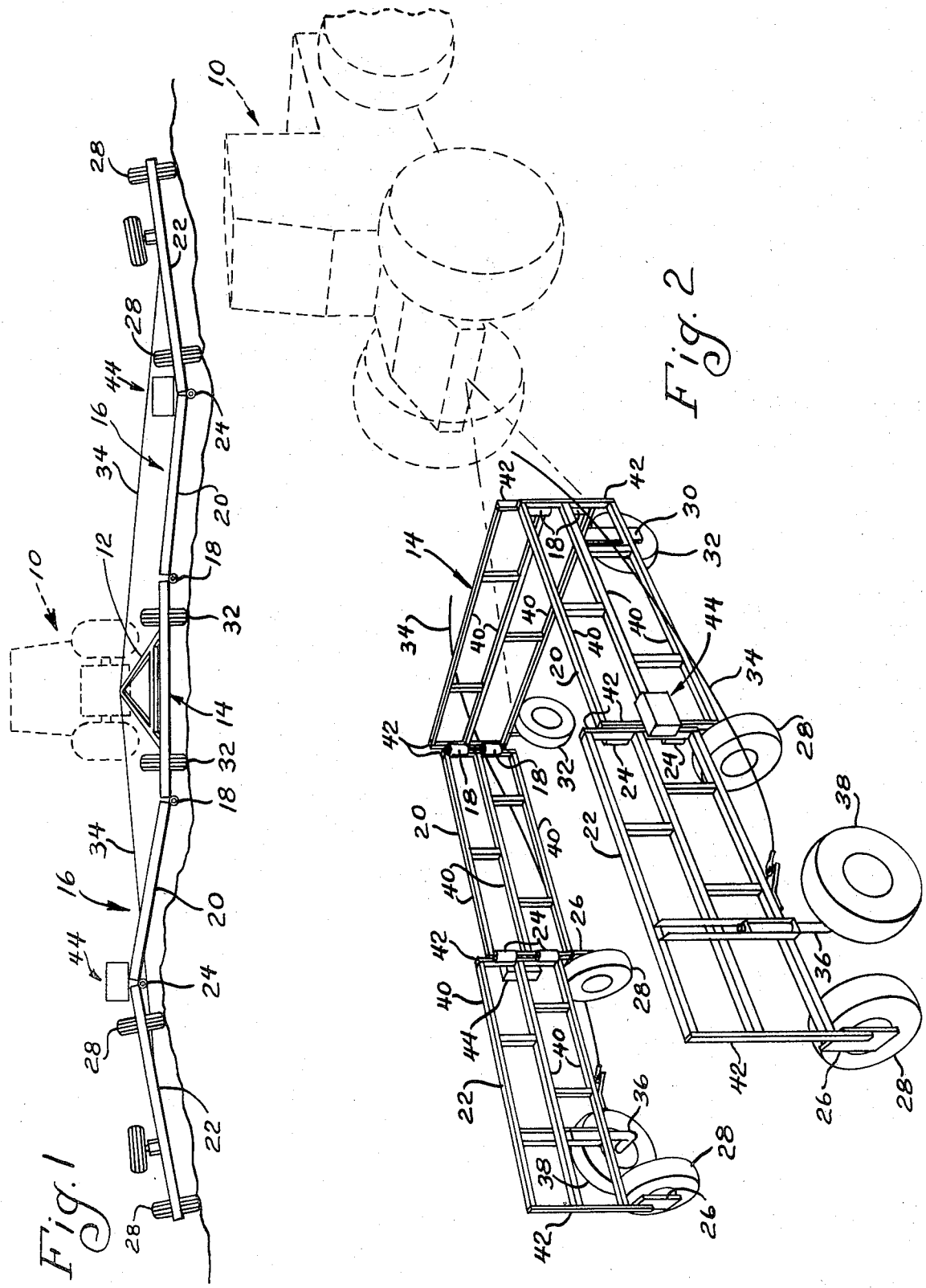

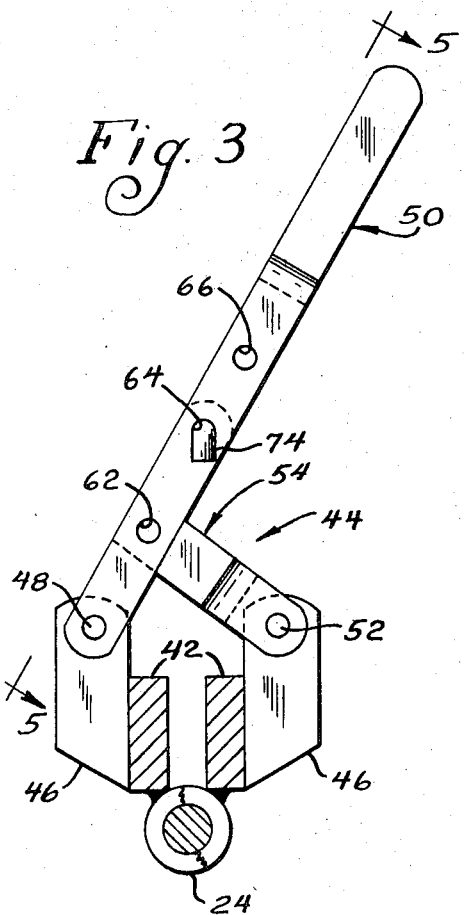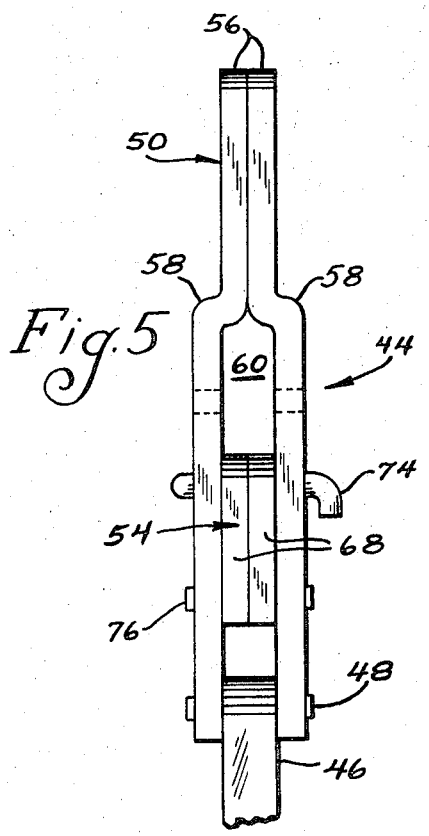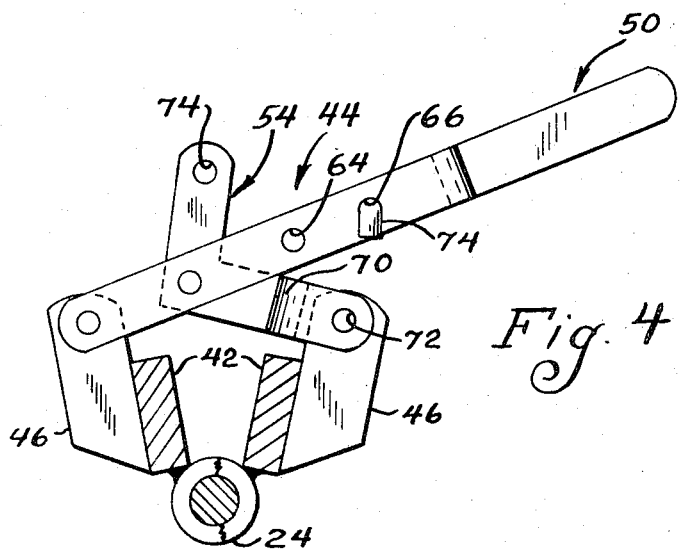

MULTIPLE-PIECE WING SECTIONS FOR CULTIVATOR AND SELECTIVELY LOCKING MEANS FOR SAME

BACKGROUND OF THE INVENTION

This invention relates to a sectional, tow type implement cart which has a pair of outboard wing sections which are movable from a laterally extending operative position to a folded inoperative or transport position with the outboard wings extending generally parallel to the direction of travel and rearwardly of a center section.

The continuing trend in agricultural operations toward more efficient implements has resulted in a variety of commercially available foldable implement structures as, for example, spring tooth cultivators. Typically, such an implement will include a central section which may be cart mounted and have tools depending therefrom along with a pair of wing sections hingedly connected to the ends of the central section. The wing sections also include tools depending therefrom and increase the width of the swath made across the field by a farmer in one traverse of the field.

As is well known, as a practical matter it is impossible to move such an implement through the usual gates in the fences surrounding fields or along roads or highways to or from a field. As a result, most such implements provide a hinged connection between the central section and the cart so that the central section is pivoted on the cart for rotation about a horizontal axis. The construction is such that when the central section is pivoted upwardly on the cart, the wing sections will follow to a vertical position. With the central sections and the wing sections extending generally horizontally, continued forward movement of the cart will result in the wing sections falling in behind the cart and assuming a position generally parallel to the direction of travel. By making the central section of an appropriately narrow width, the resulting assemblage can easily be pulled through gate openings or along roads or highways.

Of course, in order to maximize the efficiency of a farming operation in employing such an implement, it is desirable to increase the length of the wing sections to thereby increase the swath covered in one traverse of a field. As a practical matter, it is impossible to increase the width of the swath by increasing the length of the central section since that is effectively limited by the width of gate openings and the maximum permissible width of the implement when in a transport position and moving down a public roadway.

To a lesser extent, the overall width of swath is limited by the maximum permissible length of each wing section as well. Specifically, in the constructions heretofore known, each wing section consists of a single rigid frame. As the length of each such frame is increased, when the implement is drawn across the usual somewhat uneven contour of a field, it will have a greater tendency to bridge a depression or become hung up on a mound. In either instance, the efficiency is lost in that the ground engaging tools will be elevated out of contact with the underlying ground so that the desired operation will not be performed thereon. Moreover, if the frame becomes hung up on a mound, continued force applied to the same by a prime mover such as a tractor may cause substantial damage to the work performing tools thereon and/or may necessitate manual effort on the part of the farmer to free the frame and the tools thereon from the mound.

Thus, the maximum width of swath of current implements of this type is practically limited by the foregoing factors.

SUMMARY OF THE INVENTION

It is the principal object of the invention to provide a new and improved foldable implement whereby a greater width of swath may be obtained than with currently known constructions. More specifically, it is an object of the invention to provide such an implement wherein the wing sections are nonrigid thereby allowing the same to conform to the underlying contour without appreciable bridging or hangup problems thereby allowing the length of the wing section to be increased to achieve a greater width of swath.

The exemplary embodiment of the invention achieves the foregoing objects in a construction wherein each wing section is fabricated of a plurality of individual, generally rigid frames, hingedly interconnected to each other. By reason of the hinge connection, portions of each wing section are movable relative to other portions to allow the wing sections to substantially conform to the contour of the underlying terrain.

According to a preferred embodiment, alternate frames of each wing section and a central frame are staggered in a direction parallel to the intended path of travel to preclude interference between tools mounted on each frame section.

The invention also contemplates the provision of means for precluding oscillation of the frames of each wing section when the implement is in transport. According to the preferred embodiment, a mechanical lock is provided to disable the hinges and is selectively operable.

One preferred form of a lock construction includes an elongated handle pivoted to one frame of a wing section and an L-shaped link pivoted to the adjacent frame of the wing section and pivotally connected to the handle. A lock pin may interconnect both the handle and the lock forming a connection to each to thus rigidify the wing sections.

Other objects and advantages will become apparent from the following specification taken in conjunction with the accompanying drawings.

DESCRIPTION OF THE DRAWINGS

FIG. 1 is a perspective view of an implement made according to the invention with the implement supporting sections in a work performing position;

FIG. 2 is a perspective view of the implement with the sections in a transport position;

FIG. 3 is a view of a locking mechanism in a locked condition with parts shown in section;

FIG. 4 is a view of the locking mechanism in an unlocked condition, also with parts shown in section; and FIG. 5 is a view taken approximately along the line 5—5 of FIG. 3.

DESCRIPTION OF THE PREFERRED EMBODIMENT

An exemplary embodiment of the invention is illustrated in FIGS. 1 and 2 as being pulled by a tractor, generally designated 10, shown in dotted lines. As best seen in FIG. 1, the implement includes a conventional drawbar 12 which may also form a portion of the frame of a cart.

At the rearward end of the drawbar 12 forming the cart, a central implement supporting section, generally designated 14, may be mounted for pivotal movement about a horizontal axis by conventional means (not shown) between a generally horizontal work performing position (FIG. 1) and a generally vertical transport position (FIG. 2). The length of the central section 14 will be dictated by practical consideration such as maximum permitted overall width of the tractor and tow in moving down roadways, width of gates, etc. As is well known, ground engaging tools at spring teeth (not shown) are secured to the section 14 to depend therefrom.

Hingedly connected to opposite ends of the central section 14 are wing sections, generally designated 16. The connections are established by hinges 18 as is well-known. According to the exemplary embodiment, each of the wing sections 16 is formed of a pair of frames, the inboard frame being designated 20 and the outboard frame being designated 22. The two frames 20 and 22 at their point of adjacency are hingedly connected by hinges 24 and like the section 14 are adapted to support depending tools (not shown).

The outboard ends of each of the frames 20 and 22 include forwardly projecting arms 26 which journal wheels 28. Similar arms 30 on the central section 14 journal wheels 32 and as may be appreciated from an inspection of FIG. 1, the wheels 28 and 32 support the entire implement including the central section 14 and the wing sections 16 when the sections are in the work performing position.

To provide a support for the outboard ends of the wings when in the work performing position, cables 34 extending from the drawbar 12 to the outboard frames 22 are employed. The cables are provided with any suitable releasable means to allow folding of the wing sections for transport.

Each of the outboard frames 22, near its outboard end, includes a forwardly projecting wheel mount 36 which in turn journals a respective wheel 38. The arrangement is such that the forwardmost portion of the wheel 38 is ahead of the forwardmost portion of the wheels 28 so that when the sections are rotated to a transport position, i.e., vertical, the wheels 38 will engage the ground while elevating the wheels 28 above the ground. As can be seen in FIG. 2, when the device is in the transport position, the same is supported by the wheels 32 and 38.

As can also be seen in FIG. 2, each of the frames or sections includes plural frame members 40 connected together at their respective ends by end rails 42. The hinges 24 and 18 are, in turn, connected to the end rails and preferably the arrangement is such that the various sections or frames are staggered with respect to each other as illustrated in FIG. 2. That is, when in the working position, the central section 14 will be somewhat rearwardly of the inboard frames 20 as will be the outboard frames 22. Since, as is well known, ground engaging tools (not shown) are supported by the frame members 40, the foregoing staggered arrangement precludes tools on adjacent ones of the frame support sections from engaging one another when they pivot relative to each other about the hinges 24 or 18.

Because when the implement is in the transport position, and the trailing or wing sections 16 are jointed by the hinges 24 between the frames 20 and 22, it will be appreciated that some relative movement therebetween may occur. That is, the two frames 20 and 22 will oscillate relative to each other. To preclude such oscillation during transport, lock means, generally designated 44, interconnect the side rails 42 of the frames 20 and 22 at their point of adjacency.

Turning now to FIGS. 3–5, inclusive, the lock means 44 may be seen in greater detail. Remote sides of adjacent side rails 42 mount tongues 46 which extend away from the side rails 42 in a direction opposite the point of connection of the side rails 42 to the hinges 24. Each tongue, at its end remote from the point of connection to the side rail 42, includes a pivot aperture (not shown). One of the apertures receives a pivot pin 48 for journaling a Y-shaped handle member, generally designated 50, while the aperture on the other tongue 46 receives a pivot pin 52 for journaling an L-shaped link, generally designated 54.

As best seen in FIG. 5, the Y-shaped handle member 50 is defined by a pair of elongated metal plates 56 having deformations intermediate their ends as at 58 to define a space 60 of sufficient width to receive the L-shaped link 54. The plates 56, in addition to the aperture receiving the pin 48, include aligned apertures 62, 64 and 66.

The L-shaped link 54 is also formed of two side-by-side plates, designated 68, and the end of the long leg thereof includes deformation 70 to define a Y-shaped end having an aperture 72 receiving the pivot pin 52 to journal the link 54 to the associated tongue 46.

At the juncture of the two legs of the L-shaped link 54 there is located an aperture (not shown) which is adapted to be aligned with the apertures 62 in the handle 50. Additionally, the end of the short leg of the L-shaped link 54 includes an aperture 74 which is spaced a distance from the aforementioned aperture at the juncture of the two legs a distance corresponding to the distance between the apertures 62 and 64 in the handle member 50.

A pivot pin 76 extends through the aperture 62 and the aperture at the junction of the legs of the L-shaped link 54 to journal the L-shaped link to the handle 50 within the space 60.

The assemblage is completed by a removable lock pin 74 which is sized to extend through the aperture 64 and the aperture 74 when aligned or through the aperture 66. While not shown, it is contemplated that the lock pin 74 be affixed to a flexible element such as a chain which in turn may be affixed to the handle member 50 to preclude the removable lock pin 74 from being lost.

When the frame sections are in the working position and it is desired that the frames 20 and 22 flex relative to each other about the hinges 24, the lock pin 74 is disposed in the aperture 66. This permits relative movement between the handle 50 and the L-shaped link 54 as illustrated in FIG. 4. However, when it is desired that the sections be placed in the transport position, to preclude undesirable oscillation, the handle 50 may be grasped manually and pulled until the short leg of the L-shaped member 54 is aligned with the handle 50 so that the lock pin 74 may be placed through the apertures 74 and 64 as illustrated in FIG. 3. In such a case, relative movement between the link 54 and the handle 50 is precluded thereby fixing the frames 20 and 22 relative to each other to preclude oscillation during transport.

It will therefore be appreciated that the invention provides a new and improved farming implement whereby width of swath can be maximized without incurring difficulties due to uneven terrain. Moreover, the provision of a lock means insures that undesirable oscillation during transport will not take place.

I claim:

1. A farm implement of the foldable, sectional tow type comprising a wheeled cart bearing a central tool supporting section and mounting said central section for movement about a generally horizontal axis between a work performing position and a transport position; and a pair of tool supporting wing sections, one on each side of said central section, each wing section being hingedly connected to said central section and movable therewith between said transport position and said work performing position and having at least two differing portions, each of said wing sections being flexible so as to permit movement of at least one portion of each wing section relative to another portion thereof to allow each wing section, when in the work performing position, to flex to conform to the contour of the underlying terrain whereby the length of each wing section can be maximized to thereby maximize the width of swath of the implement when said central section and said wing sections are in said work performing position, and means for effectively rigidifying said wing sections to preclude said portions of the same from oscillating relative to each other when said wing sections are in said transport position.

2. The implement of claim 1 wherein said rigidifying means comprises a mechanical lock.

3. A farm implement of the foldable sectional tow type comprising: a wheeled cart; a central section adapted to mount ground working tools pivotally mounted on said wheeled cart for movement between a generally horizontal work performing position and a generally vertical, transport position; a pair of wing sections, one on each side of said central section; hinge means pivotally connecting each of said wing sections to the adjacent side of said central section whereby said wing sections may move between said generally horizontal work performing position and said generally vertical transport position with said central section; each of said wing sections being defined by a plurality of frames each adapted to mount ground engaging, work performing tools; additional hinge means hingedly interconnecting the frames of each wing section to permit relative movement therebetween about a generally horizontal axis extending approximately parallel to the direction of travel of said implement when said frames are in said work performing position; and means for substantially precluding said wing section frames from moving relative to each other when said sections are in said generally vertical transport position.

4. An implement according to claim 3 wherein said precluding means comprises means for selectively disabling said additional hinge means.

5. An implement according to claim 4 wherein said disabling means comprises at least one lock means on each of said wing sections.

6. An implement according to claim 5 wherein each of said lock means comprises a first element pivotally secured to one of the frames; a second element pivotally secured to the adjacent frame and pivotally secured to said first element; and means for precluding said first element from pivoting relative to said second element.

7. An implement according to claim 6 wherein said first element comprises an elongated handle and said second element includes an L-shaped link; and said precluding means comprises a lock pin adapted to interconnect said handle and said link at a point remote from their pivotal connection to each other.

8. An implement according to claim 3 wherein alternate ones of said frames comprising said wing sections and said central frame are staggered relative to the adjacent frames in a direction parallel to the direction of travel of said implement when said frames are in said work performing position to thereby preclude interference between tools secured to said frames.

* * * * *